United States Patent [19]

Cusano et al.

[11] Patent Number: 5,124,834
[45] Date of Patent: Jun. 23, 1992

[54] TRANSFERRABLE, SELF-SUPPORTING PELLICLE FOR ELASTOMER LIGHT VALVE DISPLAYS AND METHOD FOR MAKING THE SAME

[75] Inventors: Dominic A. Cusano, Schenectady; Stanley J. Lubowski, Scotia, both of N.Y.

[73] Assignee: General Electric Company, Schenectady, N.Y.

[21] Appl. No.: 437,422

[22] Filed: Nov. 16, 1989

[51] Int. Cl.⁵ .................. G02B 26/00; H04N 5/74
[52] U.S. Cl. .................... 359/291; 359/292; 358/233; 358/234
[58] Field of Search .............. 350/362, 361, 360; 358/233, 232, 234; 359/290, 291, 292, 296

[56] References Cited

U.S. PATENT DOCUMENTS

| 3,541,992 | 11/1970 | Herrick et al. | 178/7.5 |
| 3,882,271 | 5/1975 | Glenn | 178/7.3 D |
| 4,119,368 | 10/1978 | Yamazaki | 350/360 |
| 4,212,519 | 7/1980 | Drexhage et al. | 350/362 |
| 4,441,791 | 4/1984 | Hornbeck | 350/360 |
| 4,529,620 | 7/1985 | Glenn | 427/88 |
| 4,626,920 | 12/1986 | Glenn | 358/234 |
| 4,879,602 | 11/1989 | Glenn | 358/233 |

FOREIGN PATENT DOCUMENTS 3503079  8/1985  Fed. Rep. of Germany ...... 350/360

OTHER PUBLICATIONS

Kozol et al., Target Assembly for a Deformographic Display Device, IBM Tech. Bulletin, vol. 20, No. 11B, Apr. 1978, p. 4754.

Primary Examiner—Eugene R. LaRoche
Assistant Examiner—Evelyn A. Lester
Attorney, Agent, or Firm—Marvin Snyder; James C. Davis, Jr.

[57] ABSTRACT

An elastomeric light valve has a substrate with a principal surface on which is formed a multiplicity of pixels; each pixel includes a first set of pixel electrodes interdigitated with a second set of pixel electrodes. A silicone elastomer gel is disposed over both the principal substrate surface and the two sets of pixel electrodes. At least one silicone/polycarbonate self-supporting pellicle is disposed substantially completely over the gel layer; the pellicle and elastomer gel layer are heat cured to improve the response of the layers to electrostatic forces induced in the light valve by control voltages applied during operation of the light valve. A layer of gold is disposed over the at least one pellicle and a layer of silver is disposed over the gold layer to provide an exposed specular surface which is easily deformed and resilient to transverse stresses. Address-lines are provided for applying control voltages to the first and second sets of pixel electrodes responsive to a video signal; a bias voltage is applied to the gold and silver layers to provide optimum light valve sensitivity at lower control voltages.

21 Claims, 3 Drawing Sheets

TRANSFERRABLE, SELF-SUPPORTING PELLICLE FOR ELASTOMER LIGHT VALVE DISPLAYS AND METHOD FOR MAKING THE SAME

BACKGROUND OF THE INVENTION

The present invention relates to video display systems and, more particularly, to a novel pellicle and a method for making the pellicle for use in an improved elastomer light valve which is capable of operating at much lower voltages than have heretofore been possible.

Elastomer light valves are typically used with an optical subsystem, such as a Schleiren optical system or the like, to convert video signals into a viewable image projected on a screen. The light valve includes a deformable material, such as silicone elastomer gel or the like, disposed between a set of electrodes arrayed on a substrate and a thin conductive layer which serves as both a common electrode and a light reflective layer. A layer of material is typically disposed between the conductive layer and the elastomer gel to chemically separate them. The array of electrodes is divided into smaller groupings which collectively form a plurality of picture elements, or pixels. The pixels are typically arranged in uniform rows and columns to form an X-Y matrix structure.

In a typical video display device, electronic circuitry receives and samples a video signal; the sampled video signal is converted to control voltages which are selectively applied to the individual pixel electrodes via a combination of a plurality of X-address lines (typically one for each row, or column, of pixels), a plurality of Y-address lines (one for each column, or row, of pixels) and a semiconductor switch (such as a thin-film field-effect transistor or the like). The voltages applied to the pixel electrodes, relative to the thin conductive layer, create a charge pattern on the array of electrodes which causes the deformable elastomer gel and thin conductive layer to deform, or ripple, in a pattern determined by the magnitude and polarity of the applied voltages. Light incident upon the light-reflective surface of the thin conductive layer will be reflected and diffracted. The reflected light may be projected as a viewable image on a screen by a Schleiren optical system as disclosed in U.S. Pat. No. 3,084,590.

Control voltages of some conventional light valves may be as high as 100 volts or more to achieve acceptable deformation of the light reflective conductive layer. Low voltage operation is desired, however, since the individual pixels are preferably driven by amorphous silicon (a-Si) field-effect transistors (FETs) because of their potentially small size, low power consumption, favorable switching speeds, ease of fabrication, and compatibility with light valve structures. High control voltages are also undesirable because they may cause the elastomer gel layer and the light-reflective conductive layer disposed thereon to lag substantially or stick before returning to an undeformed condition after the control voltages are turned off.

Early attempts to construct a low voltage light valve were not very successful. One construction involved depositing a layer of metallization (for the reflective conductive layer) directly on the soft, tacky and spongy surface of the elastomer gel. An adverse chemical reaction occurred between the metal and the elastomer gel, causing the gel to darken and stiffen at the interface and causing a reduction in the sensitivity of the light valve to the control voltages. The gel also caused some etching of the metal layer and the highly-desirable specular character of the metal top surface was degraded.

This construction was modified to include a pellicle, formed from a plastic or nitrocellulose material, positioned as an interface between the elastomer gel and the reflective conducting electrode to isolate the two chemically-incompatible materials. This structure permitted some reduction in control voltages, although further reduction in operating voltages, to values below about 20 volts and as low as about 5 volts, are desired in some applications. The magnitude of the control voltages required for adequate deformation will be a function of the elasticity of the materials from which the pellicle and the conductive layer are made and the thicknesses of these materials.

It is accordingly a primary object of the present invention to provide a novel elastomer light valve structure which is not subject to the foregoing disadvantages.

It is a further object of the present invention to provide an elastomer light valve which is highly sensitive to low control voltages.

These and other objects of the invention, together with the features and advantages thereof, will become apparent from the following detailed specification when read with the accompanying drawings in which like reference numerals refer to like elements.

SUMMARY OF THE INVENTION

In accordance with the present invention, an elastomer light valve includes an insulative substrate, preferably of glass, a ceramic material or the like, having a principal substrate surface on which is deposited a first layer of metallization, preferably molybdenum or the like, having a thickness of about 3000 angstroms. The metallization layer is photolithographically patterned to form a plurality of interdigitated electrodes forming a grid-like arrangement. A layer of silicone elastomer gel, such as G.E. RTV 6159®️ (as manufactured by the General Electric Company), Siligard 527®️ (as manufactured by the Dow Chemical Company) and the like, is deposited over the electrode grid and the principal substrate surface to a thickness of between about 10 and about 20 microns. At least one pellicle, of heat-cured silicone/polycarbonate copolymer material and the like, having a thickness between about 200-400 angstroms, is deposited on the elastomer gel. A second metallization layer, of a metal having good adhesive characteristics and chemical compatibility relative to the pellicle material, is deposited substantially completely over the pellicle. The second metallization layer should also exhibit specular qualities; if not, a third layer of material, which adheres well to the second metallization layer and has specular characteristics, may be deposited substantially completely upon the second metallization layer. The second metallization layer is preferably gold deposited to a thickness of about 200 angstroms by vacuum evaporation and the third metallization layer is preferably silver deposited to a thickness of about 400 angstroms also by vacuum evaporation.

In accordance with the present invention, a method for fabricating an elastomer light valve includes the steps of: depositing a first conductive layer on a principal substrate surface; patterning the first conductive layer to form a grid of spaced electrodes; depositing an elastomer gel over the electrode grid and substrate; forming at least one transferrable, self-supporting pellicle of a silicone/polycarbonate material; depositing the at least one pellicle on the elastomer gel; heat curing the pellicle and elastomer gel; depositing a second conductive layer, of a material which exhibits good adhesion and chemical compatibility to the silicone/polycarbonate pellicle, on the at least one pellicle to a thickness of about 200 angstroms; and depositing a third layer of material, which exhibits specular qualities and good adhesion to the second conductive layer, on the second conductive layer to a thickness of about 400 angstroms. The second and third conductive layers are preferably gold and silver, respectively.

DETAILED DESCRIPTION OF THE PREFERRED EMBODIMENT

Figure 1:
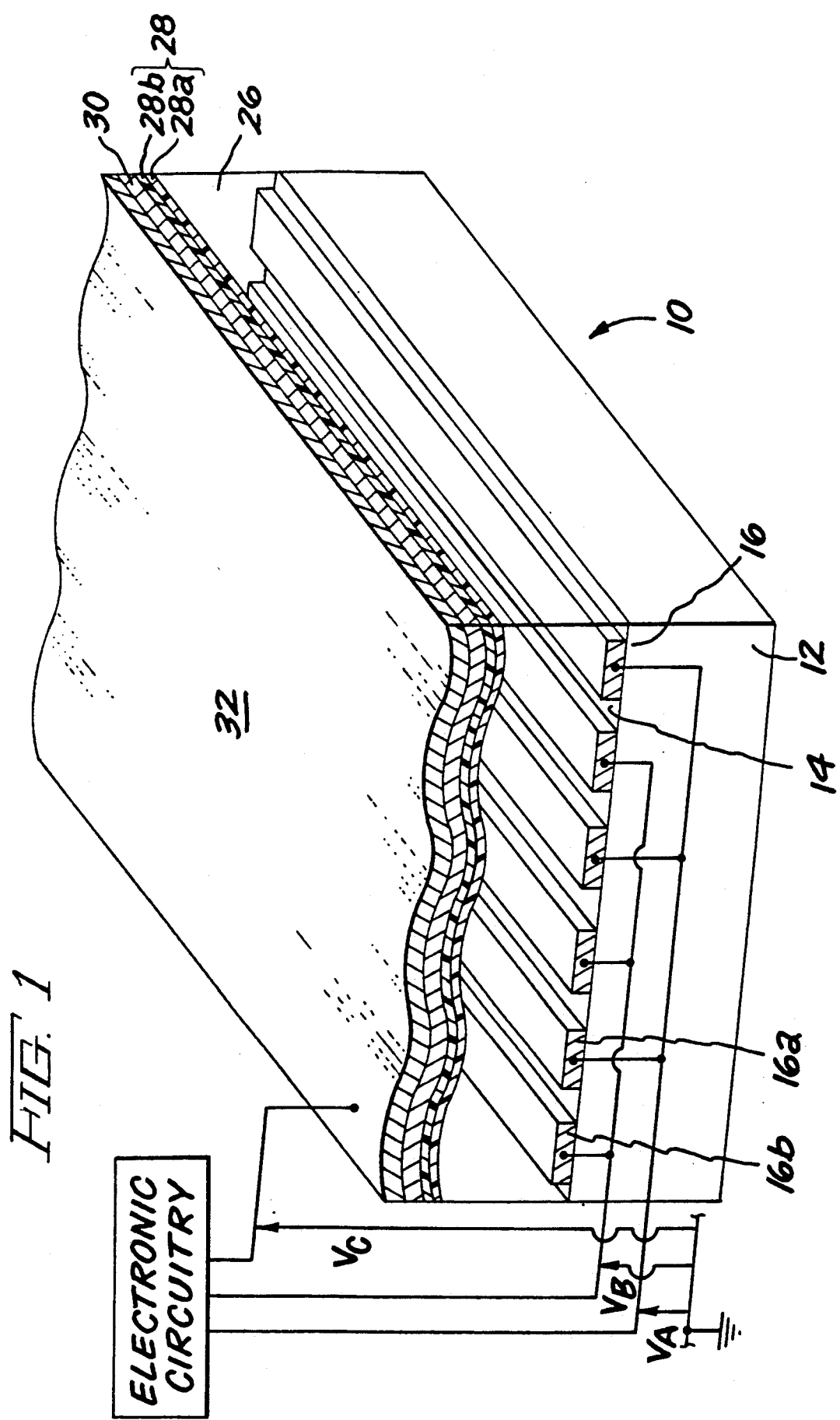
FIG. 1 is a perspective view of an elastomeric light valve in accordance with the present invention.
Figure 2:
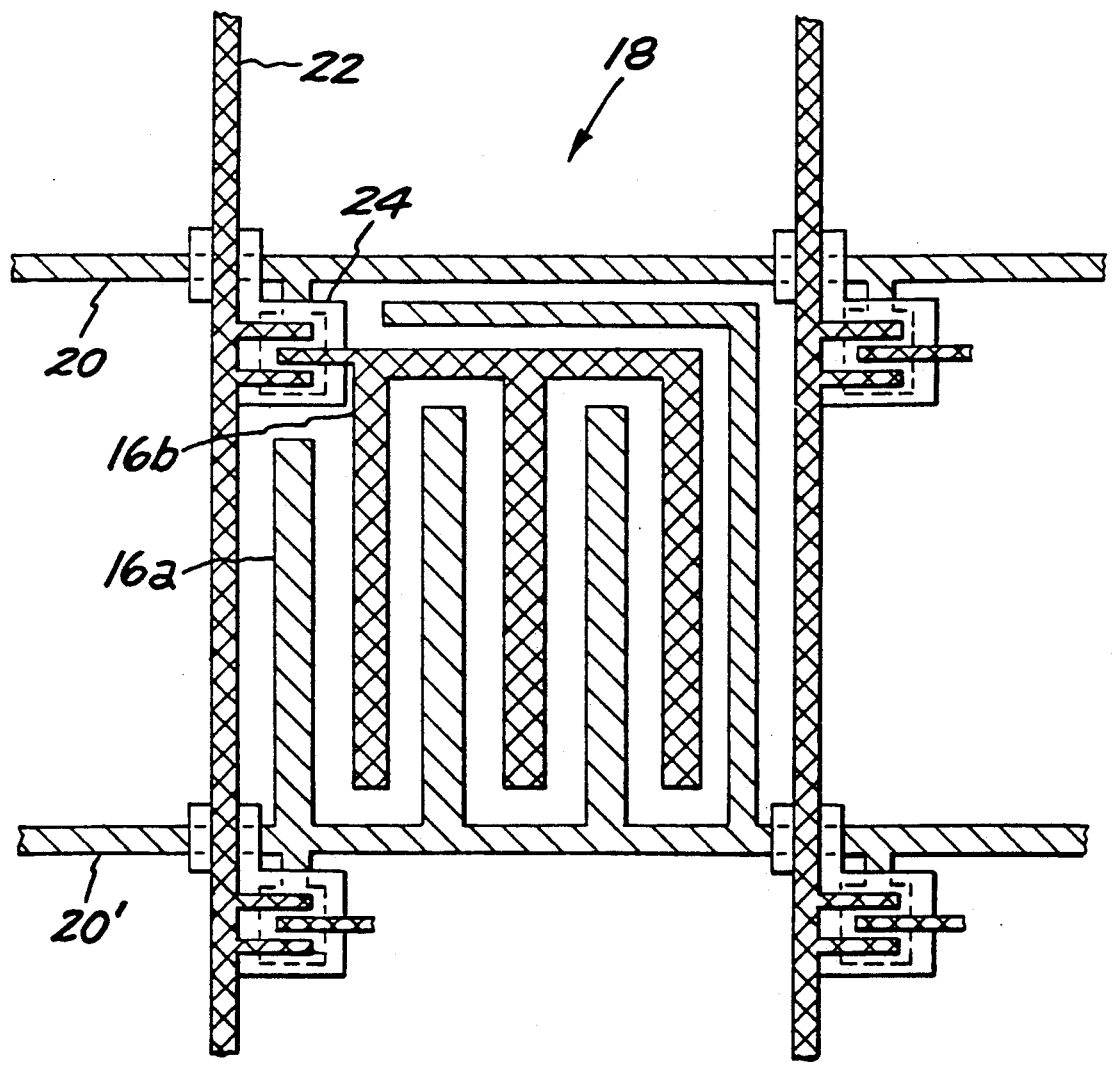
FIG. 2 is a detailed plan view of an electrode grid of an elastomeric light valve pixel.

Referring initially to FIG. 1, an elastomeric light valve 10 includes an insulative substrate 12 of glass, ceramic material or the like, having a principal substrate surface 14. A first layer of metallization is deposited on principal substrate surface 14 to a thickness of about 3,000 angstroms. The first metallization layer is photolithographically patterned to form a grid-like structure of interdigitated electrodes 16, as best shown in FIG. 2. The interdigitated electrodes are formed into a plurality of groups, with each group defining a picture element, or pixel, 18 of elastomeric light valve 10. Communication with the individual pixel electrodes 16a and 16b is accomplished by a plurality of X-address, or scan, lines 20 and a plurality of Y-address, or data, lines 22. A semiconductor switch, preferably an amorphous-silicon field-effect-transistor (FET) 24 or the like, is formed with each pixel 18 to control the voltage applied to pixel electrodes 16b. In operation, a control voltage will be applied to electrodes 16b by FET 24 (which is proportional to a voltage applied to data line 22) when a gate voltage is simultaneously applied to scan line 20 to switch FET 24 to a conducting state. Another control voltage may also be applied to pixel electrodes 16a by scan line 20'.

A layer 26 of a silicone elastomer gel, such as G.E. RTV 6159 ® (as manufactured by the General Electric Company), Siligard 527 ® (as manufactured by the Dow Chemical Company) or the like, is deposited over the pixel electrode grid and substrate surface 14. The elastomer gel layer is preferably about 10 to 20 microns thick.

A pellicle means 28 (of at least one pellicle, but preferably two or more pellicles 28a and 28b) is disposed over elastomer gel layer 26. Each pellicle is preferably about 200 to 400 angstroms thick. Each pellicle 28 is preferably fabricated by forming a mixture of dimethyl siloxane and bisphenol-A polycarbonate dispersed in trichloropropane solvent. Preferably, a mixture containing 57 percent by weight dimethyl/siloxane and 43 percent by weight bisphenol-A polycarbonate is diluted to 5 percent by weight in trichloropropane. A drop of this solution is deposited onto a smooth distilled water surface; the drop will immediately spread out to several inches in diameter and the trichloropropane will rapidly evaporate to form a film on the smooth water surface. The film is allowed to dry for about two to five minutes or more and is then removed from the surface of the water with a glass or metal loop placed under the surface of the water and carefully lifted up at a slight angle to engage the self-supporting film and remove it from the water. When freed from the water surface, the film will become taut and free-standing while adhering to the glass or metal loop. The film may then be dried for several hours at room temperature, or preferably cured at a temperature of about 70° C. for about two to five minutes to form a pinhole/defect-free macromolecular pellicle with oppositely facing smooth surfaces which is transferrable without damage from the loop to other surfaces. The block copolymer structure of the silicone/polycarbonate pellicle exhibits good elastomer characteristics for deformation under transverse stress, as will be discussed hereinafter. After curing, pellicle 28 is carefully transferred to the elastomer gel surface by contacting one edge of the gel surface with a side edge of the pellicle and then moving toward the opposite edge to avoid entrapment of air bubbles. No bonding agent is necessary, because the copolymer pellicle and the elastomer gel will stick together naturally. Subsequent pellicles may be deposited over the first pellicle in a similar manner to avoid entrapment of air bubbles. Again, no bonding agent will be necessary as the polymer pellicles will adhere to each other naturally. Preferably at least two pellicles are deposited over the elastomer gel in this fashion. After pellicles 28 have been deposited, the elastomer gel-pellicle combination is cured for about two hours at a temperature between about 38° C. to 65° C.

After curing pellicles 28a and 28b and elastomer gel layer 26, a second layer 30 of metallization is deposited over pellicle means 28 by evaporation to a thickness of about 200 angstroms. Second metallization layer 30 is preferably gold, although any metal or alloy which exhibits good adhesion to the silicone/polycarbonate pellicle and which is chemically compatible with the pellicle may also be used. A third layer 32 of metallization is deposited, preferably by evaporation, over second layer 30 to a thickness of about 400 angstroms. Third metallization layer 32 is preferably silver because of its specular characteristics and its good adhesion characteristics to underlying gold layer 30. The silver may be deposited directly on pellicle 28b, as silver does not appear to chemically react as strongly with the copolymer pellicles with respect to the reaction of silver and the elastomer gel layer when silver was deposited directly on the gel layer in prior art light valves. The best optical results appear to be realized by depositing a first gold layer 30 followed by silver layer 32. Metallization layers 30 and 32 also serve as a common electrode which may be biased with a voltage $V_C$ of proper polarity and magnitude relative to ground potential during operation of the elastomeric light valve to provide suitable deformation or rippling of layers 26, 28, 30 and 32.

The electronic circuitry (FIG. 1) receives and samples a video signal which is converted to control voltages $V_A$ and $V_B$ and bias voltage $V_C$. Control voltage $V_A$ is applied to pixel electrodes 16a by scan line 20'

(FIG. 2) and control voltage $V_B$ is applied to pixel electrodes 16b by data line 22 when FET 24 becomes conductive by simultaneously applying a gate voltage to scan line 20. If a bias voltage $V_C$ is simultaneously applied to metallization layer 32, the same degree of deformation of layers 26, 28, 30 and 32 can be achieved with control voltages $V_A$ and $V_B$ reduced in magnitude because the electrostatic forces caused by the voltages will be cumulative. Additionally, the structure and composition of pellicles 28a and 28b and of metallization layers 30 and 32, as described above, improves deformation sensitivity to electrostatic forces, to further permit reduction of control voltages $V_A$ and $V_B$ below about 20 volts and in some situations to as low as about 5 volts.

Figure 3:
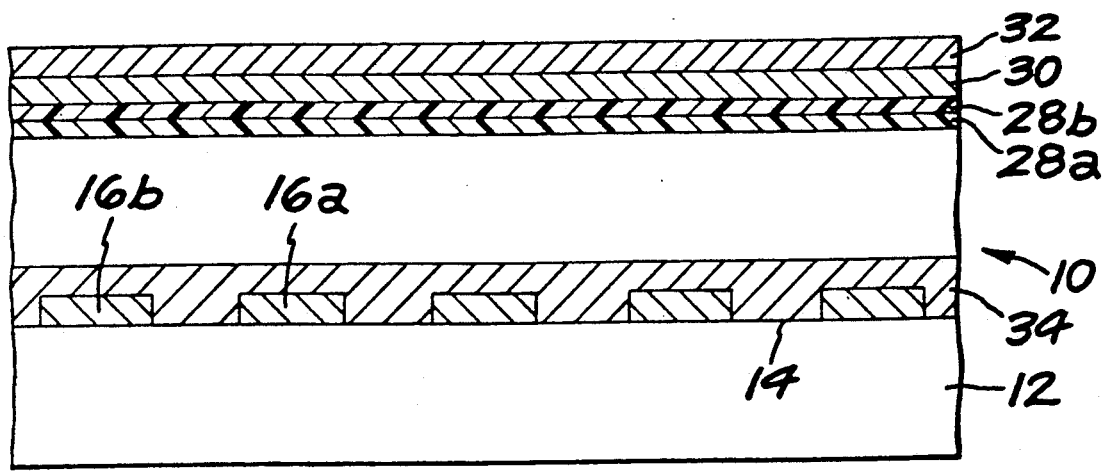
FIG. 3 is a side elevation view of an elastomeric light valve in accordance with an alternate embodiment of the present invention.

Referring now to FIG. 3, in an alternate embodiment, a thin layer 34 of insulation material, such as silicon nitride or the like, is deposited on substrate surface 14, over pixel electrodes 16a and 16b, to avoid any chemical incompatibility problems between the pixel electrode metallization and elastomer gel layer 26. The addition of insulation layer 34 may affect some properties of elastomeric light valve 10, such as polarization, time constants and burn-in, i.e., the time it takes the light valve to return to its original undeformed position after the control voltages are removed.

Figure 4:
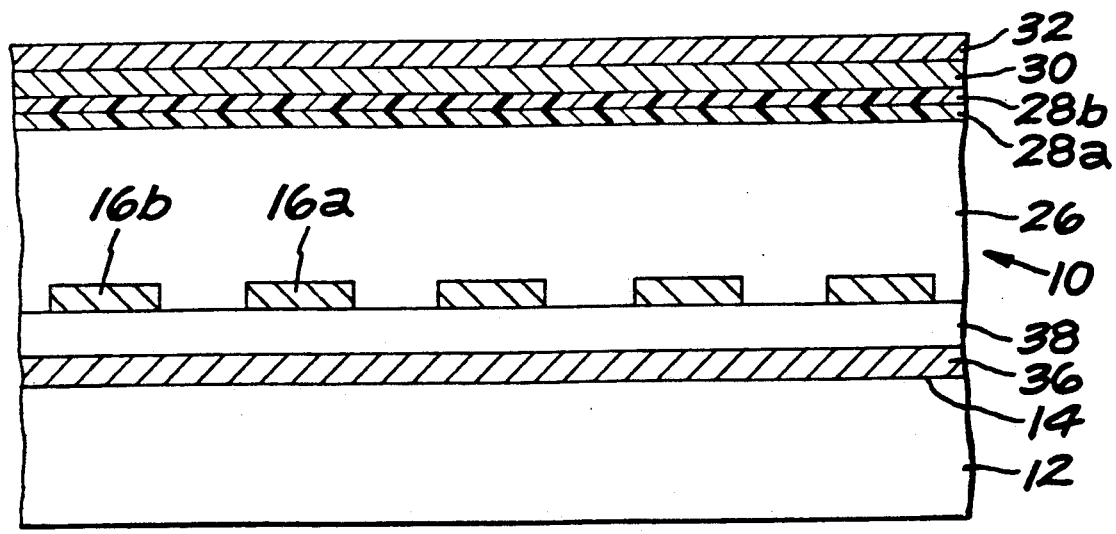
FIG. 4 is a side elevation view of an elastomeric light valve in accordance with a further embodiment of the present invention.

Referring to FIG. 4, in a further embodiment, a layer of metallization 36 is deposited on principal substrate surface 14 followed by a layer 38 of insulation material deposited on metallization layer 36. Pixel electrodes 16a and 16b are then formed on insulation layer 38, as shown in FIG. 4. This light valve structure provides storage capacitance to each pixel to improve frame storage capabilities in video display applications.

It will be readily understood by those skilled in the art that the present invention is not limited to the specific embodiments described and illustrated herein. Different embodiments and adaptations besides those shown herein and described, as well as many variations, modifications, and equivalent arrangements will now be apparent or will be reasonably suggested by the foregoing specification and drawings, without departing from the substance or scope of the invention. While the present invention has been described herein in detail in relation to its preferred embodiments, it is to be understood that this disclosure is only illustrative and exemplary of the present invention and is made merely for purposes of providing a full and enabling disclosure of the invention. Accordingly, it is intended that the invention be limited only by the spirit and scope of the claims appended hereto.

What is claimed is:

1. An elastomeric light valve, comprising:
   a substrate having a surface;
   a multiplicity of pixels formed on said substrate surface, each pixel comprising interdigitated first and second sets of pixel electrodes;
   a layer of silicone elastomer gel disposed over said substrate surface and said first and second sets of pixel electrodes;
   at least one self-supporting pellicle disposed substantially completely over said gel layer and formed of a silicone/polycarbonate material;
   a conductive layer disposed substantially completely over and adhering to said at least one pellicle, a surface of said conductive layer closest to said substrate being chemically compatible with said at least one pellicle, and a surface of said conductive layer farthest from said substrate being a specular exposed surface;
   means for selectively applying control voltages to said first and second sets of pixel electrodes; and
   means for selectively applying a bias voltage to said conductive layer to improve the light valve deformability.

2. The light valve of claim 1, wherein the elastomer gel layer has a thickness between about 10-20 microns.

3. The light valve of claim 1, wherein the at least one pellicle has a total thickness between about 200-400 angstroms.

4. The light valve of claim 1, wherein said conductive layer comprises a first sublayer of gold disposed on the at least one pellicle and a second sublayer of silver disposed on said first sublayer of gold.

5. The light valve of claim 4, wherein said first sublayer of gold is about 200 angstroms thick and said second sublayer of silver is about 400 angstroms thick.

6. The light valve of claim 1, comprising, said at least one pellicle and said elastomer gel layer being heat cured to improve deformability of the light valve because of electrostatic forces.

7. The light valve of claim 1, further comprising a thin layer of insulation material disposed between said gel layer and said first and second sets of pixel electrodes.

8. An elastomeric light valve, comprising:
   a substrate having a surface;
   a multiplicity of pixels formed on said substrate surface, each pixel comprising interdigitated first and second sets of pixel electrodes;
   a layer of silicone elastomer gel disposed over said substrate surface and said first and second sets of pixel electrodes;
   at least two self-supporting pellicles disposed substantially completely over said elastomer gel layer, each of said pellicles having a thickness between about 200-400 angstroms and formed of a silicone/polycarbonate material;
   a conductive layer disposed substantially completely over and adhering to an upper one of said pellicles, a surface of said conductive layer closest to said substrate being chemically compatible with said upper one of said pellicles, and a surface of said conductive layer farthest from said substrate being a specular exposed surface;
   means for selectively applying control voltages to said first and second sets of pixel electrodes; and
   means for selectively applying a bias voltage to said conductive layer to improve the light valve deformability.

9. An elastomeric light valve, comprising:
   a substrate having a surface;
   a multiplicity of pixels formed on said substrate surface, each pixel comprising interdigitated first and second sets of pixel electrodes;
   a layer of silicone elastomer gel disposed over said substrate surface and said first and second sets of pixel electrodes;
   at least one self-supporting pellicle disposed substantially completely over said gel layer, said at least one pellicle having a defect-free macromolecular structure with oppositely facing smooth surfaces formed by heat curing said at least one pellicle;
   a conductive layer disposed substantially completely over and adhering to said at least one pellicle, a surface of said conductive layer closest to said substrate being chemically compatible with said at least one pellicle, and a surface of said conductive layer farthest from said substrate being a specular exposed surface;

means for selectively applying control voltages to said first and second sets of pixel electrodes; and means for selectively applying a bias voltage to said conductive layer to improve the light valve deformability.

10. A elastomeric light valve, comprising:

a substrate having a surface;

a layer of metallization disposed on said substrate surface;

a layer of insulation material disposed on said metallization layer;

a multiplicity of pixels formed on said layer of insulation material, each pixel comprising interdigitated first and second sets of pixel electrodes;

a layer of silicone elastomer gel disposed over said substrate surface and said first and second sets of pixel electrodes;

at least one self-supporting pellicle disposed substantially completely over said gel layer;

a conductive layer disposed substantially completely over and adhering to said at least one pellicle, a surface of said conductive layer closest to said substrate being chemically compatible with said at least one pellicle, and a surface of said conductive layer farthest from said substrate being a specular exposed surface;

means for selectively applying control voltages to said conductive layer to improve the light valve deformability.

11. A method of making a light valve, comprising the steps of:

(a) providing a substrate with a surface;

(b) depositing a first layer of metallization on the substrate surface;

(c) etching the first metallization layer to form a multiplicity of pixels, each pixel comprising interdigitated first and second sets of pixel electrodes;

(d) depositing a silicone elastomer gel layer over the substrate surface and the first and second sets of pixel electrodes;

(e) depositing at least one self-supporting pellicle over the elastomer gel layer;

(f) heat curing the elastomer gel layer and the at least one pellicle to improve deformability of the light valve when an electrostatic force is applied thereto; and (g) depositing at least one conductive layer substantially completely over and adhering to the at least one pellicle, a layer closest to the substrate being chemically compatible with the at least one pellicle, and a layer furthest from the substrate having a specular exposed surface.

12. The method of claim 11, wherein step (e) includes the steps of:

(1) forming a mixture of dimethyl siloxane and bisphenol-A polycarbonate in selected proportions;

(2) dispersing the mixture of step (1) in trichloropropane solvent to form a solution;

(3) depositing a drop of the step (2) solution onto a distilled water surface;

(4) allowing the trichloropropane solvent to evaporate to form a film on the distilled water surface;

(5) removing the film from the distilled water;

(6) heat curing the film at a selected temperature for a selected duration; and (7) placing the cured film on the gel layer.

13. The method of claim 12, wherein step (1) comprises mixing about 57% by weight dimethyl siloxane with about 43% by weight bisphenol-A polycarbonate.

14. The method of claim 13, wherein step (2) comprises the step of diluting the mixture of step (1) to about 5% by weight in trichloropropane solvent.

15. The method of claim 12, wherein step (6) is accomplished at a temperature of about 70° C. for between about 2 and about 5 minutes.

16. The method of claim 11, wherein step (f) is accomplished at a temperature between about 38° C. and about 65° C. for about 2 hours.

17. The method of claim 11, wherein the elastomer gel layer is about 10 to 20 microns thick.

18. The method of claim 11, wherein the at least one pellicle is about 200 to 400 angstroms thick.

19. The method of claim 11, wherein step (g) comprises the steps of:

depositing a first layer of gold over the at least one pellicle; and depositing a second layer of silver over the gold layer.

20. The method of claim 19, wherein the gold layer is about 200 angstroms thick and the silver layer is about 400 angstroms thick.

21. The method of claim 11, wherein step (g) comprises the step of depositing a layer of silver over the at least one pellicle.

* * * * *